US012606317B2

(12) United States Patent
Adhikari

(10) Patent No.: US 12,606,317 B2
(45) Date of Patent: Apr. 21, 2026

(54) ANOMALY DETECTION AND FAULT ISOLATION FOR VEHICLE SUB-SYSTEMS

(71) Applicant: THE BOEING COMPANY, Arlington, VA (US)

(72) Inventor: Partha Adhikari, Bengaluru (IN)

(73) Assignee: The Boeing Company, Arlington, VA (US)

( * ) Notice: Subject to any disclaimer, the term of this patent is extended or adjusted under 35 U.S.C. 154(b) by 222 days.

(21) Appl. No.: 18/491,706

(22) Filed: Oct. 20, 2023

(65) Prior Publication Data

US 2025/0128826 A1 Apr. 24, 2025

(51) Int. Cl.
_B64D 45/00_ (2006.01)

(52) U.S. Cl.
CPC ...... _B64D 45/00_ (2013.01); _B64D 2045/0085_ (2013.01)

(58) Field of Classification Search
CPC ............ B64D 45/00; B64D 2045/0085; G05B 23/0243; G05B 23/0281; G05B 23/0283; G05B 23/0235; G05D 1/86
See application file for complete search history.

(56) References Cited

U.S. PATENT DOCUMENTS

| | | | | |
|---|---|---|---|---|
| 2012/0137367 A1* | 5/2012 | Dupont | ............... | G06F 21/00 |
| | | | | 726/25 |
| 2013/0294938 A1* | 11/2013 | Worden | ............... | F04B 25/00 |
| | | | | 417/244 |
| 2017/0197606 A1* | 7/2017 | Kipp | ............... | B60T 8/885 |

| | | | | |
|---|---|---|---|---|
| 2017/0372601 A1* | 12/2017 | Yamashita | ............. | G08C 25/00 |
| 2018/0003122 A1* | 1/2018 | Burkell | .............. | F04B 25/00 |
| 2019/0146470 A1* | 5/2019 | Akkaram | ........... | G05B 23/0289 |
| | | | | 700/30 |
| 2019/0258251 A1* | 8/2019 | Ditty | ............... | G05D 1/0274 |
| 2022/0057473 A1* | 2/2022 | Amarnathan | ......... | G01S 5/0289 |
| 2024/0028014 A1* | 1/2024 | Capoccia | ........... | G05B 19/4184 |
| 2024/0161038 A1* | 5/2024 | Sloane | .............. | G06Q 10/0635 |
| 2025/0181802 A1* | 6/2025 | Couture | .............. | G01R 31/367 |

FOREIGN PATENT DOCUMENTS

| | | |
|---|---|---|
| CN | 110162746 A | 8/2019 |
| CN | 112396105 B | 11/2023 |

OTHER PUBLICATIONS

Extended European Search Report for European Application No. EP24207529.9 dated Mar. 28, 2025, 11 pages.

* cited by examiner

Primary Examiner — Donald J Wallace
Assistant Examiner — Jalal C Coduroglu
(74) Attorney, Agent, or Firm — Harrity & Harrity, LLP

(57) ABSTRACT

Techniques for anomaly detection are disclosed. These techniques include identifying a plurality of three or more redundant sub-systems in a system. The techniques further include forming a plurality of combinations of the redundant sub-systems, each combination relating to a subset of the plurality of redundant sub-systems. The techniques further include identifying a first combination with the least variability among sub-systems, from among the plurality of combinations of redundant sub-systems. The techniques further include computing one or more nominal values for one or more parameters of a first sub-system, of the plurality of sub-systems, using the first combination, and detecting an anomaly in the first sub-system based on the computed one or more nominal values.

20 Claims, 10 Drawing Sheets

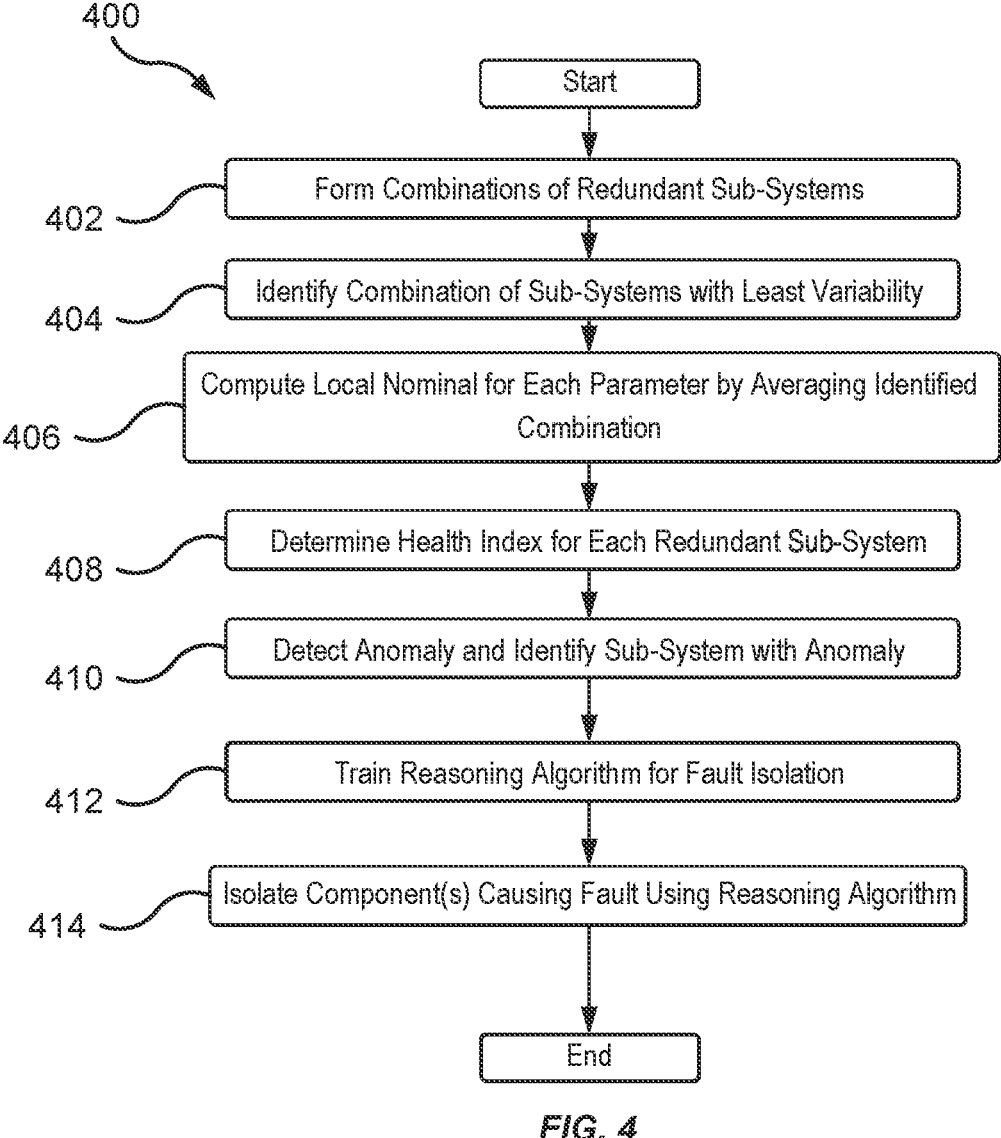

400

402 Form Combinations of Redundant Sub-Systems

404 Identify Combination of Sub-Systems with Least Variability

406 Compute Local Nominal for Each Parameter by Averaging Identified Combination 408 Determine Health Index for Each Redundant Sub-System 410 Detect Anomaly and Identify Sub-System with Anomaly 412 Train Reasoning Algorithm for Fault Isolation 414 Isolate Component(s) Causing Fault Using Reasoning Algorithm

*FIG. 4*

| Flight Leg | S1 | S2 | S3 | Degradation due to fault | Region |
|---|---|---|---|---|---|
| 1 | No | No | No | No Fault | A |
| 2 | No | No | No | No Fault | A |
| 3 | Yes | No | Yes | F1 | B |
| 13 | Yes | No | Yes | F1 | B |
| 18 | No | Yes | No | No Fault | A |
| 19 | No | Yes | Yes | F2 | B |
| 29 | No | Yes | Yes | F2 | B |
| 32 | No | No | No | No Fault | A |
| 33 | No | Yes | No | No Fault | A |
| 34 | Yes | Yes | No | F3 | B |
| 35 | Yes | Yes | No | F3 | B |

| Chain_ID | Chain_Length | Start_Date | End_Date |
|---|---|---|---|
| 0 | 1.0 | 76.0 | 2013-11-21 19:48:00+00:00 | 2014-01-06 13:39:00+00:00 |
| 1 | 6.0 | 172.0 | 2014-03-14 19:33:00+00:00 | 2014-07-01 19:19:00+00:00 |
| 2 | 7.0 | 123.0 | 2014-08-03 08:57:00+00:00 | 2014-10-24 12:03:00+00:00 |
| 3 | 9.0 | 176.0 | 2014-12-07 05:12:00+00:00 | 2015-03-29 00:28:00+00:00 |
| 4 | 10.0 | 93.0 | 2015-04-25 17:53:00+00:00 | 2015-06-16 20:57:00+00:00 |
| 5 | 11.0 | 49.0 | 2015-17-17 11:59:00+00:00 | 2015-08-16 11:36:00+00:00 |
| 6 | 26.0 | 87.0 | 2015-11-22 13:10:00+00:00 | 2016-01-06 12:56:00+00:00 |
| 7 | 33.0 | 50.0 | 2016-04-24 20:50:00+00:00 | 2016-05-25 04:41:00+00:00 |
| 8 | 825.0 | 74.0 | 2020-02-24 13:27:00+00:00 | 2020-08-04 16:38:00+00:00 |
| 9 | 828.0 | 131.0 | 2020-11-18 01:23:00+00:00 | 2021-02-15 13:07:00+00:00 |
| 10 | 830.0 | 94.0 | 2021-03-23 12:04:00+00:00 | 2021-05-06 13:56:00+00:00 |
| 11 | 832.0 | 306.0 | 2021-05-24 14:07:00+00:00 | 2021-10-23 18:50:00+00:00 |

ANOMALY DETECTION AND FAULT ISOLATION FOR VEHICLE SUB-SYSTEMS

FIELD

Aspects of the present disclosure relate to anomaly detection for complex systems, including vehicles.

BACKGROUND

Detecting degradation, and isolating fault, in complex systems (e.g., aircraft, other vehicles, or other complex systems) is very challenging. For example, anomalies in a particular aircraft sub-system can be detected by identifying correlated degradation signatures within features, before failure. But these degradation signatures may not be reflected in direct sensor measurements. Further, identifying anomalies typically requires characterizing or deriving nominal behavior of a component under varied operating conditions, which is very challenging because there can be a wide variance of sensor data under dynamic operating conditions, and an associated controller can attempt to compensate for the degradation. Limited sensor data and low sample data also add to the challenges.

SUMMARY

Aspects include a method. The method includes identifying a plurality of three or more redundant sub-systems in a system. The method further includes forming a plurality of combinations of the redundant sub-systems, each combination relating to a subset of the plurality of redundant sub-systems. The method further includes identifying a first combination with the least variability among sub-systems, from among the plurality of combinations of redundant sub-systems. The method further includes computing one or more nominal values for one or more parameters of a first sub-system, of the plurality of sub-systems, using the first combination, and detecting an anomaly in the first sub-system based on the computed one or more nominal values.

Aspects further include a system, including one or more processors and one or more memories storing a program, which, when executed on any combination of the one or more processors, performs an operation. The operation includes identifying a plurality of three or more redundant sub-systems in a system. The operation further includes forming a plurality of combinations of the redundant sub-systems, each combination relating to a subset of the plurality of redundant sub-systems. The operation further includes identifying a first combination with the least variability among sub-systems, from among the plurality of combinations of redundant sub-systems. The operation further includes computing one or more nominal values for one or more parameters of a first sub-system, of the plurality of sub-systems, using the first combination, and detecting an anomaly in the first sub-system based on the computed one or more nominal values.

Aspects further include a computer program product including a non-transitory computer-readable storage medium having computer-readable program code embodied therewith, the computer-readable program code executable by one or more computer processors to perform an operation. The operation includes identifying a plurality of three or more redundant sub-systems in a system. The operation further includes forming a plurality of combinations of the redundant sub-systems, each combination relating to a subset of the plurality of redundant sub-systems. The operation further includes identifying a first combination with the least variability among sub-systems, from among the plurality of combinations of redundant sub-systems. The operation further includes computing one or more nominal values for one or more parameters of a first sub-system, of the plurality of sub-systems, using the first combination, and detecting an anomaly in the first sub-system based on the computed one or more nominal values.

Aspects further include any of the aspects discussed herein, wherein the system comprises an aircraft and the three or more redundant sub-systems comprise redundant sub-systems in the aircraft.

Aspects further include any of the aspects discussed herein wherein identifying the first combination with the least variability is based on measured sensor values for one or more sub-systems and at least one of: (i) calculated physics based parameters for the one or more sub-systems or (ii) parameters from a digital twin relating to the one or more sub-systems.

Aspects further include any of the aspects discussed herein wherein identifying the first combination with the least variability is based on both calculated physics based parameters for the one or more sub-systems and parameters from the digital twin relating to the one or more sub-systems.

Aspects further include any of the aspects discussed herein wherein computing the one or more nominal values for one or more parameters of the first sub-system, of the plurality of sub-systems, using the first combination, includes averaging each parameter of the one or more parameters across the sub-systems in the first combination.

Aspects further include any of the aspects discussed herein wherein identifying the first combination with the least variability among sub-systems, from among the plurality of combinations of redundant sub-systems further identifies one or more outlier values excluded from the first combination.

Aspects further include any of the aspects discussed herein wherein detecting the anomaly in the first sub-system based on the computed one or more nominal values includes determining a health index for the first sub-system based on calculating at least one of a cosine similarity or Euclidian distance for a plurality of parameters in the sub-system compared with the computed one or more nominal values.

Aspects further include any of the aspects discussed herein wherein determining the health index for the first sub-system is based on calculating both the cosine similarity and the Euclidian distance for the plurality of parameters in the sub-system compared with the computed one or more nominal values.

Aspects further include any of the aspects discussed herein, the method or operation further including identifying a first component at least partially responsible for the anomaly in the first sub-system.

Aspects further include any of the aspects discussed herein wherein identifying the first component at least partially responsible for the anomaly in the first sub-system further includes using a reasoning algorithm to identify the first component, based on the anomaly.

Aspects further include any of the aspects discussed herein wherein the reasoning algorithm is a Bayesian network trained based on historical data relating to operation of the aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIG. 4 is a flowchart illustrating anomaly detection and fault isolation using redundancy, according to one aspect.

DETAILED DESCRIPTION

Figure 1:
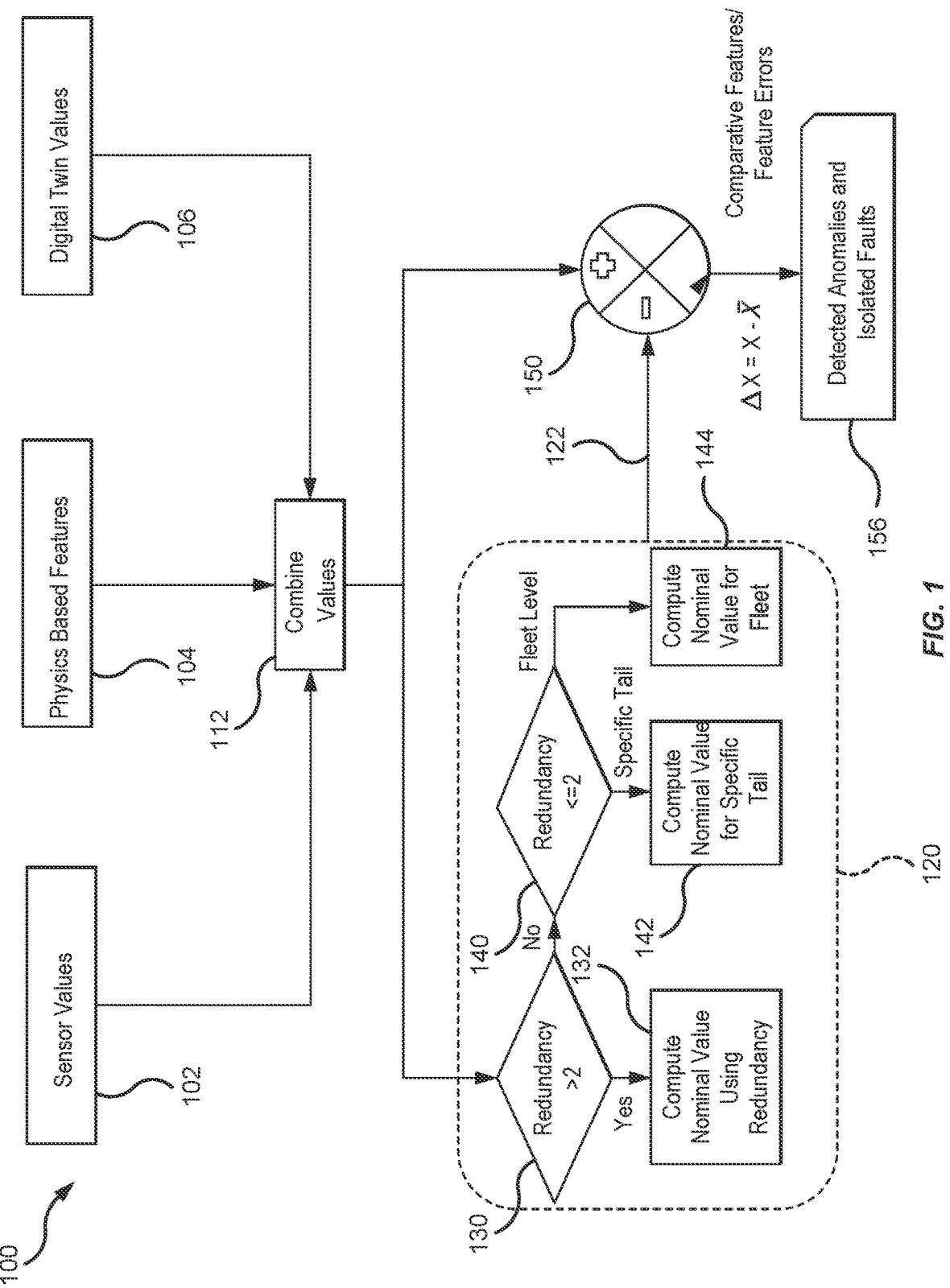
FIG. 1 illustrates anomaly detection and fault isolation for sub-systems with varying levels of redundancy, according to one aspect.

One or more aspects disclosed herein provide for anomaly detection and enhanced fault isolation for complex systems (e.g., aircraft or other vehicles). In one aspect, a complex system has sub-systems with multiple redundancies. Relative or comparative features can be computed with respect to a nominal value of respective features, and the nominal values can be estimated dynamically for each sample of data (e.g. an aircraft flight leg or flight segment or each time sample). This approach is particularly applicable for sub-systems with more than dual redundancies (e.g., three or more redundancies), which is very common for aircraft.

In an aspect, initial features are computed from direct sensor measurements, physics-based features are computed, and parameters are estimated from a digital twin. For each operational segment (e.g., aircraft flight leg) a nominal value of each feature is dynamically computed by averaging respective features of two or more subsystems that are behaving similarly. The similarity of different subsystems can be calculated using similarity scores, or using any other suitable technique.

In an aspect, advanced features are then computed from the difference of initial features compared with respective nominal values, and statistical features of those differences are derived with respect to time series data across operational segments (e.g., flight legs). Based on computing a Euclidian distance and cosine similarity (or any other suitable technique), a health index for each sub-system can be estimated. By comparing health indices over consecutive operational segments (e.g., flight legs), a sub-system with degradation is isolated. Then degraded data across operational segments (e.g., flight legs), before triggering failure events (e.g., in terms of maintenance messages), are mapped with respective fault labels based on historical data obtained in fleet operation. Historical labeled data is used to train reasoning algorithms (e.g. a Bayesian Network or a suitable machine learning (ML) model) which is used to detect a location of degradation or isolate degraded sub-system component. This is discussed further, below, with regard to FIGS. 1 and 3-6.

Further, while the techniques discussed above and below in relation to FIGS. 3-6 are suitable for systems with multiple redundant sub-systems, additional techniques can be used to identify nominal values for anomaly detection without requiring redundant sub-systems. For example, historical data for a specific sub-system (e.g., a sub-system for a specific aircraft tail) can be used to identify nominal values for that sub-system, and then the nominal values can be used to detect anomalies and isolate fault. This is discussed further, below, with regard to FIGS. 1 and 7-8. As another example, historical data for a fleet of systems (e.g., a fleet of aircraft) can be used to identify nominal values for the sub-systems in that fleet, and then the nominal values can be used to detect anomalies and isolate fault. This is discussed further, below, with regard to FIGS. 1 and 7-10.

In an aspect, one or more of these techniques have significant advantages over prior solutions. For example, degradation is often so slow that it is very difficult and computationally expensive to identify the change over time. Further, automated systems can compensate for the degradation, making the approaching anomaly even harder to find. One or more of the techniques discussed herein can be used detect degradation and approaching anomalies, in an accurate and computationally efficient manner.

FIG. 1 illustrates anomaly detection and fault isolation for sub-systems with varying levels of redundancy, according to one aspect. A computing environment 100 uses a number of input values to detect anomalies, isolate faults, or both, for sub-systems of a complex system (e.g., an aircraft, another vehicle, or any other suitable complex system). As illustrated, inputs include sensor values 102, physics based features 104, and digital twin values 106. These are merely examples, and any suitable subset of these values can be used, along with additional values (e.g., instead of, or in addition to, any combination of the sensor values 102, the physics based features 104, and the digital twin values 106). For example, sufficiently robust physics based features 104 may obviate the need for digital twin values 106 (and vice-versa).

In an aspect, the sensor values 102 are measured values (e.g., direct measured values) relating to operation of relevant sub-systems. The physics based features 104 are computed from underlying data (e.g., based on the measured sensor values 102). For example, a heat transfer coefficient for operation of a condenser sub-system can be calculated using sensor data, but not measured directly. This is just one example, and any suitable physics based features can be used. The digital twin values 106 are generated using a modeled version of the physical sub-system at issue. For example, a given physical sub-system can be modeled as a digital twin, and various digital twin values 106 can be generated using the model. Each of these values is discussed further, below, with regard to FIG. 6.

In an aspect, the sensor values 102, physics based features 104, and digital twin values are combined at block 112. These values are compared, at a comparator 150, with nominal feature values 122 generated at block 120, to generate comparative features and feature errors 154. The comparative features and feature errors 154 are then used to identify detected anomalies and isolated faults 156.

In an aspect, nominal feature values 122 can be generated at block 120 using any of several different techniques. For example, a given system may have multiple redundant sub-systems. As one example, an aircraft may include multiple redundant cabin air compressor sub-systems. These can be monitored using an aircraft condition monitoring system (ACMS). At block 130, if the sub-system at issue has more than two redundant sub-systems (e.g., three or more), the nominal value is computed at block 132 using redundancy. This is discussed further, below, with regard to FIGS. 3-6.

In an aspect, if the sub-system at issue has a redundancy of two or less, the nominal value can be computed at either block 142 or 144. For example, at block 142 the nominal value is computed for a particular sub-system (e.g., a sub-system of a particular aircraft tail) using historical data for that aircraft. This is discussed further, below, with regard to FIGS. 7-8. As another example, at block 144 the nominal value is computed at a fleet level (e.g., for a fleet of aircraft) for a sub-system for all aircraft in a given fleet. This is discussed further, below, with regard to FIGS. 9-10.

Figure 2:
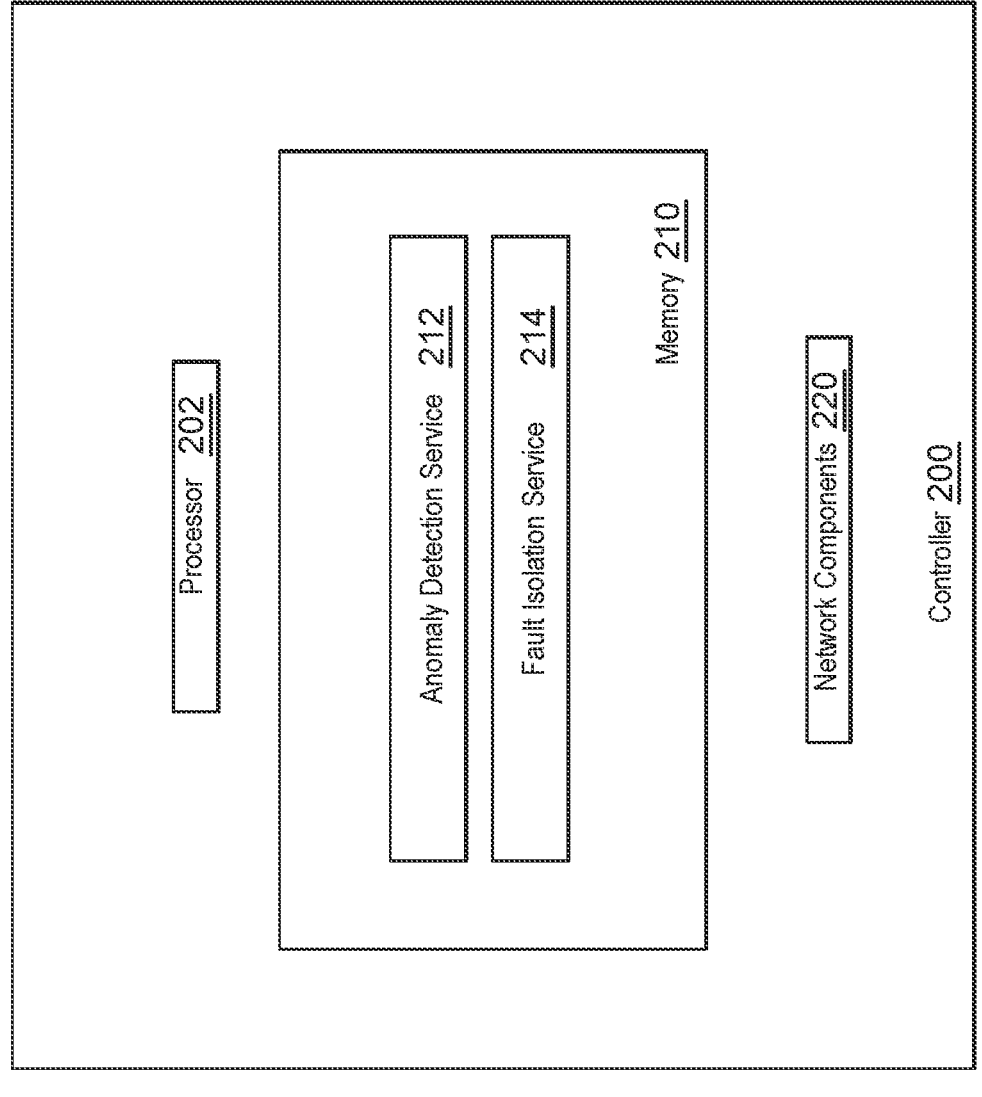
FIG. 2 illustrates a controller for anomaly detection and fault isolation for sub-systems, according to one aspect.

FIG. 2 illustrates a controller 200 for anomaly detection and fault isolation for sub-systems, according to one aspect. In an aspect, the controller 200 can be used for one or more aspects of anomaly detection and fault isolation as illustrated in the computing environment 100 illustrated in FIG. 1. The controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the controller 200 to interface with components over a network (e.g., as illustrated in FIG. 1). For example, the controller 200 can use the network components 220 to interface with remote storage and compute nodes (e.g., within the computing environment 100 or outside the computing environment 100).

The controller 200 can interface with other elements in the system over a local area network (LAN), for example an enterprise network, a wide area network (WAN), the Internet, or any other suitable network. The network components 220 can include wired, WiFi or cellular network interface components and associated software to facilitate communication between the controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the controller 200. The program code is generally described as various functional "applications" or "services" within the memory 210, although alternate implementations may have different functions and/or combinations of functions. Within the memory 210, an anomaly detection service 212 facilitates anomaly detection for a sub-system (e.g., within an aircraft, another vehicle, or any other suitable system). A fault isolation service 214 facilitates isolating fault within a sub-system (e.g., a sub-system in which an anomaly is detected using the anomaly detection service 212). This is discussed further below with regard to subsequent figures.

Although FIG. 2 depicts the anomaly detection service 212 and fault isolation service 214 as located in the memory 210 that representation is merely provided as an illustration for clarity. More generally, the controller 200 may include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processor 202 and the memory 210 may correspond to distributed processor and memory resources within a computing environment.

Figure 3:
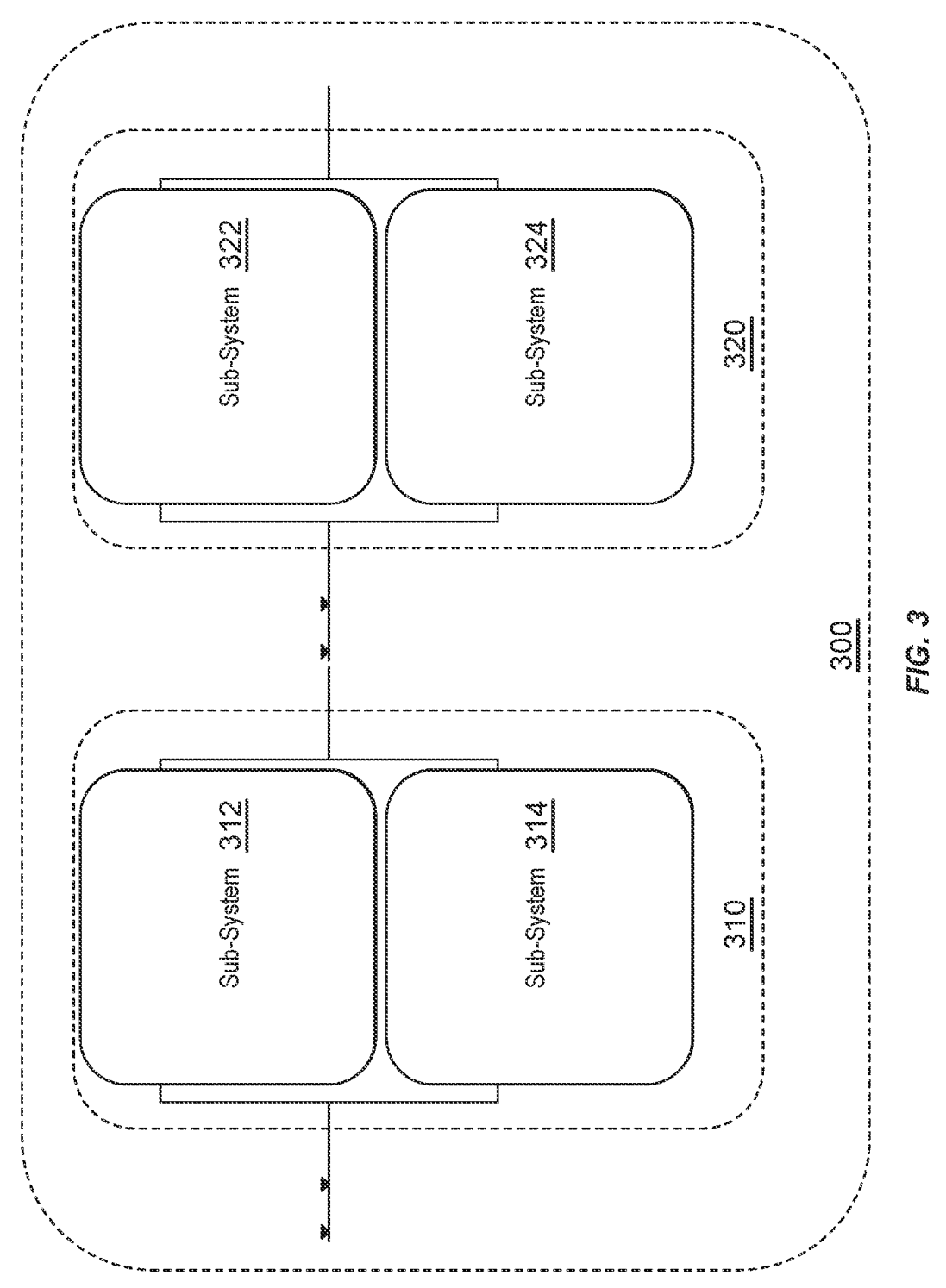
FIG. 3 illustrates anomaly detection and fault isolation using redundancy, according to one aspect.

FIG. 3 illustrates anomaly detection and fault isolation using redundancy, according to one aspect. In an aspect, a system 300 (e.g., an aircraft, another vehicle, or any other suitable system) includes multiple redundant sub-systems. For example, an aircraft could include a left cabin air compressor 310 and a right cabin air compressor 320. Each of the cabin air compressors 310 and 320 could, themselves, include redundant air compressor sub-systems. For example, the left cabin air compressor 310 could include an air compressor sub-system 312 and a redundant air compressor sub-system 314. The right cabin air compressor 320 could include an air compressor sub-system 322 and a redundant air compressor sub-system 324.

In an aspect, each of the air compressor sub-systems 312, 314, 322, and 324 can act redundantly, for each other. Thus, the system 300 includes four redundant sub-systems, allowing for computation of nominal values for anomaly detection using the redundant sub-systems (e.g., as discussed above in relation to block 132 illustrated in FIG. 1). For example, a combination of sub-systems with the least variability can be identified. Further, a combination of the redundant sub-systems can be formed and used to detect nominal values. Local nominal values can be computed for each parameter by averaging across the identified combination, and a health index for the sub-systems can be determined for each sub-system. The health index can be used to detect anomalies and identify sub-systems with anomalies, and then a reasoning algorithm can be trained and used to identify the component(s) causing degradation. This is discussed further, below, with regard to FIG. 4.

FIG. 4 is a flowchart 400 illustrating anomaly detection and fault isolation using redundancy, according to one aspect. At block 402 an anomaly detection service (e.g., the anomaly detection service 212 illustrated in FIG. 2) forms combinations of redundant sub-systems, where a system includes more than two redundant sub-systems (e.g., as illustrated in FIG. 3). In an aspect, the anomaly detection service forms combinations by selecting combinations of sub-sets of the redundant sub-systems. For example, if a given system has three redundant sub-systems A, B, and C, the anomaly detection service will form pairs {[A, B], [A, C], [B, C]}. As another example, the system 300 illustrated in FIG. 3 includes four redundant air compressor sub-systems 312, 314, 322, and 324. The anomaly detection service can form combinations of two sub-systems (e.g., {[312, 314], [312, 322], [312, 324], [314, 322], [314, 324], [322, 324]}) or three sub-systems (e.g., {[312, 314, 322], [312, 314, 314], [312, 322, 324], [314, 322, 324]}).

At block 404, the anomaly detection service identifies the combination of sub-systems with the least variability (e.g., the least average variability across the combination). As discussed above, in an aspect a system includes more than two redundant sub-systems. The anomaly detection service can calculate variability for each of the combinations of sub-systems (e.g., as discussed above in relation to block 402). The combination with the least variability can be used to identify an anomaly (e.g., an outlier). For example, assume a system includes the four redundant air compressor sub-systems 312, 314, 322, and 324 illustrated in FIG. 3. If the combination [312, 314, 322] has the least variability (e.g., between the sub-systems in the combination), that suggests that the remaining sub-system (e.g., the sub-system 324) is an outlier and an anomaly.

In an aspect, the anomaly detection service uses any combination of sensor values (e.g., the sensor values 102 illustrated in FIG. 1), computed physics based features (e.g., the physics based features 104 illustrated in FIG. 1), and digital twin values (e.g., the digital twin values 106 illustrated in FIG. 1) to identify the combination of sub-systems with the least variability. For example, sensor values, computed physics based features, and digital twin values can all be used to identify variability in operation across sub-systems. Alternatively, any suitable subset of sensor values, computed physics based features, and digital twin values can be used. This is discussed further, below, with regard to FIG. 6.

At block 406, the anomaly detection service computes a local nominal (e.g., a mean) for each parameter by averaging across the identified combination. In an aspect, the anomaly detection service uses the combination of redundant sub-systems identified above at block 404. The anomaly detection service averages the various parameters relating to each of these sub-systems (e.g., detected sensor values), across the sub-systems in the combination. This creates a local nominal value while avoiding including the outlier.

For example, as above assume the combination [312, 314, 322] has the least variability across sub-systems in the combination and is identified at block 404. The anomaly detection service can average sensor data points across the three sub-systems [312, 314, 322] to identify the local nominal of each parameter. This avoids including the sub-system 324, which is potentially an outlier.

At block 408, the anomaly detection service determines a health index for each redundant sub-system. For example, the anomaly detection service can calculate cosine similarity, Euclidian distance, or both, for all parameters in the sub-system, using the local nominal values calculated at block 406. This can be used to calculate a health index for each of the sub-systems.

At block 410, the anomaly detection service detects an anomaly and identifies the sub-system that includes the anomaly. For example, the anomaly detection service can compare sub-system behavior across multiple operational cycles (e.g., multiple flight legs for an aircraft) by calculating the health index for the sub-system for each operational cycle. If a given sub-system consistently has a low health index (e.g., the lowest health index among the redundant sub-systems present in the system) then that sub-system likely has an anomaly.

For example, assume an aircraft includes the redundant air compressor sub-systems [312, 314, 322, 324] illustrated in FIG. 3. The health index for each of these sub-systems can be calculated across three flight legs, using the techniques discussed above in relation to block 408 for each flight leg. If the sub-system 314 has the lowest health index across all three flight legs, then it can be identified as having an anomaly.

In an aspect, numerous actions can be taken based on the detected anomaly. For example, a warning could be created to indicate the anomaly and alert maintenance personnel to investigate or repair the sub-system (e.g., prior to failure). As another example, automated actions could be taken to disable the sub-system or repair the sub-system (e.g., automated software or hardware corrections). These are merely example, and any suitable action can be taken.

At block 412, the anomaly detection service trains a reasoning algorithm (e.g., a Bayesian network). For example, historical data across flight legs can be used to train a Bayesian network to identify the component causing fault, within the sub-system with an anomaly. The training can include creation of a discretized feature set mapping with degradation labels. A Bayesian network is merely one example, and any suitable reasoning algorithm (e.g., a suitable machine learning (ML) model) can be used. This is discussed further, below, with regard to FIG. 5.

At block 414, the anomaly detection service isolates components causing fault using the reasoning algorithm. For example, the anomaly detection service can use the operation data for the sub-system with an anomaly to infer the component causing fault, using the reasoning algorithm.

In an aspect, isolating the component can also be used for numerous actions. For example, a warning could be created to indicate the component causing fault for maintenance personnel to investigate or repair the component (e.g., prior to failure). As another example, automated actions could be taken to disable the component or repair the component (e.g., automated software or hardware corrections). These are merely example, and any suitable action can be taken.

Figure 5:
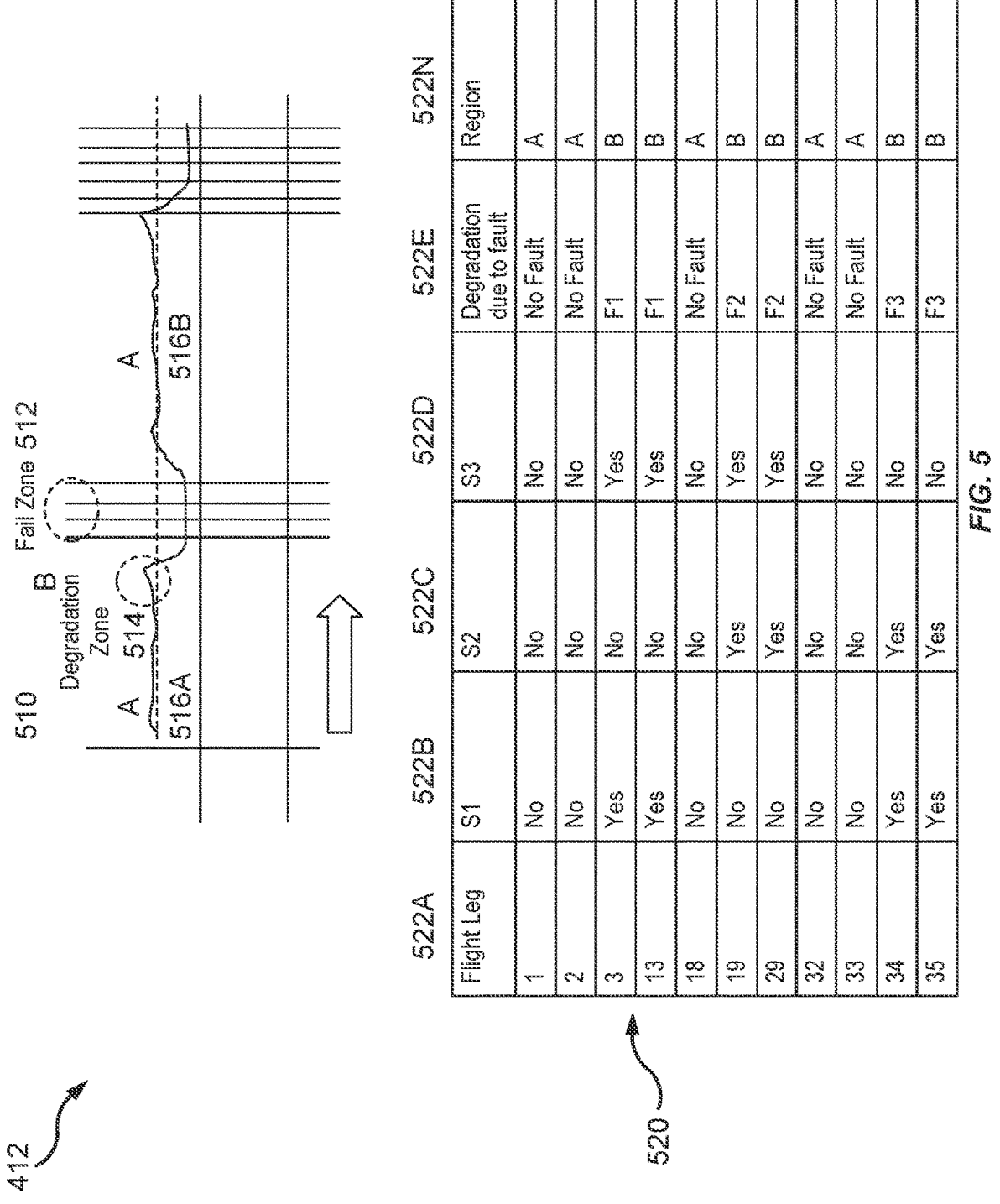
FIG. 5 illustrates an example of creation of labeled data for reasoning network based fault isolation, according to one aspect

FIG. 5 illustrates an example of creation of labeled data for reasoning network based fault isolation, according to one aspect. A diagram 510 illustrates zones of sensor data, including a fail zone 512 and a degradation zone 514. Further, the diagram 510 illustrates regions A and B. In an aspect, the regions A illustrate a nominal zone while the region B illustrates a degradation zone. For example, the diagram 510 can illustrate sequential flight legs from left to right. In an initial A region, labeled 516A, the sensor values are nominal. This indicates that the sub-system is likely operating normally. In a degradation zone B, labeled 514, the sub-system sensor values indicate degradation, before finally failing in the fail zone 512. The sub-system is then repaired (e.g., fault components or aspects are repaired or replaced), and it operates normally again in the second A region labeled 516B.

A table 520 illustrates a discretized feature set mapping for use by a reasoning network (e.g., a Bayesian network). In an aspect, the table 520 illustrates an example feature mapping for sensor data, as illustrated in the diagram 510, across multiple flight legs. Each of the columns 522A-N includes degradation data, while each row corresponds to a flight leg (e.g., for a given aircraft). The table illustrates historical degradation data, and can be used to train the reasoning algorithm for fault isolation.

In an aspect, for each feature in a flight phase (e.g. taxi, take-off, cruise, or any other suitable flight phase) of a flight leg, aggregated features (e.g. mean, standard deviation, Z-score, or any other suitable aggregated features) are computed. Computed aggregated features can be discretized into various categorical states (e.g. 'High', 'Low', 'Healthy', 'Degraded', or any other suitable categorical state) with respect to respective nominal values for each aggregated feature. A table (e.g., the table 520) is prepared for all flight legs in a fleet. During degradation stages, component failure modes are mapped with adjacent historical ground truth replacement for each row of the table. Once this data is prepared for a complete fleet, various multi-class classifiers, reasoning algorithms (e.g. Bayesian Network) or pattern-based approach can be applied for isolation of the degraded component.

Figure 6:
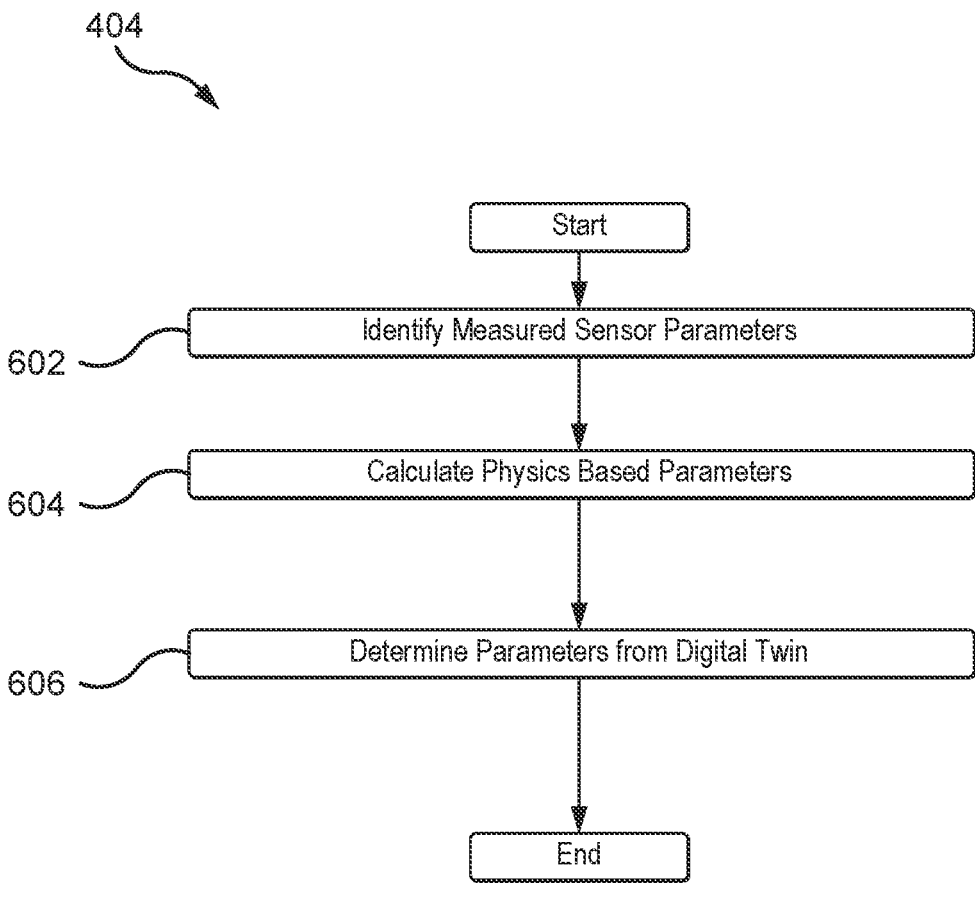
FIG. 6 is a flowchart illustrating an initial set of absolute features, according to one aspect.

FIG. 6 is a flowchart illustrating an initial set of absolute features, according to one aspect. In an aspect, FIG. 6 corresponds with aspects of block 404 illustrated in FIG. 4.

As discussed above, in an aspect an anomaly detection service (e.g., the anomaly detection service 212 illustrated in FIG. 2) uses any combination of sensor values (e.g., the sensor values 102 illustrated in FIG. 1), computed physics based features (e.g., the physics based features 104 illustrated in FIG. 1), and digital twin values (e.g., the digital twin values 106 illustrated in FIG. 1) to identify an average variability for a selected combination of sub-systems (e.g., a selected combination as discussed above in relation to block 402 illustrated in FIG. 4).

At block 602, the anomaly detection service identifies measured sensor parameters. In an aspect, one or more sensors can be used to measure various sensor values for a given sub-system. These sensor parameters represent the direct measured state of the sub-system.

At block 604, the anomaly detection service calculates one or more physics based parameters. In an aspect, the physics based parameters are not measured directly. Instead, the physics based parameters are calculated using the sensor data. For example, a heat transfer coefficient can be calculated for an air compressor sub-system (e.g., the air compressor sub-systems 312, 314, 322, and 324 illustrated in FIG. 3). The heat transfer coefficient is not measured directly, and is instead calculated from measured sensor values. This is merely one example, and any suitable physics based parameter(s) can be used.

At block 606, the anomaly detection service determines parameters from a digital twin. In an aspect, a digital twin is a virtual representation of a physical asset (e.g., enabled through data and simulators). A digital twin can be used for real-time prediction, optimization, monitoring, controlling, and improved decision making (among other uses). For example, a digital which can be an appropriately synchronized body of useful information (e.g., structure, function, and behavior) of a physical entity in virtual space, with flows of information that enable convergence between the physical and virtual state. In an aspect, a digital twin is a digital replica of a physical asset in operation, having one or more of the following properties: individual, adaptable, continuous, and scalable.

In an aspect, the anomaly detection service uses (or generates) a digital twin of a sub-system at issue (e.g., the air compressor sub-systems illustrated in FIG. 3). The anomaly detection service uses the digital twin to identify parameters of the sub-system, in a variety of operating conditions and hypothetical scenarios. The anomaly detection service can use these parameters to identify the average variability across redundant sub-systems, as discussed above in relation to FIG. 4.

Figure 7:
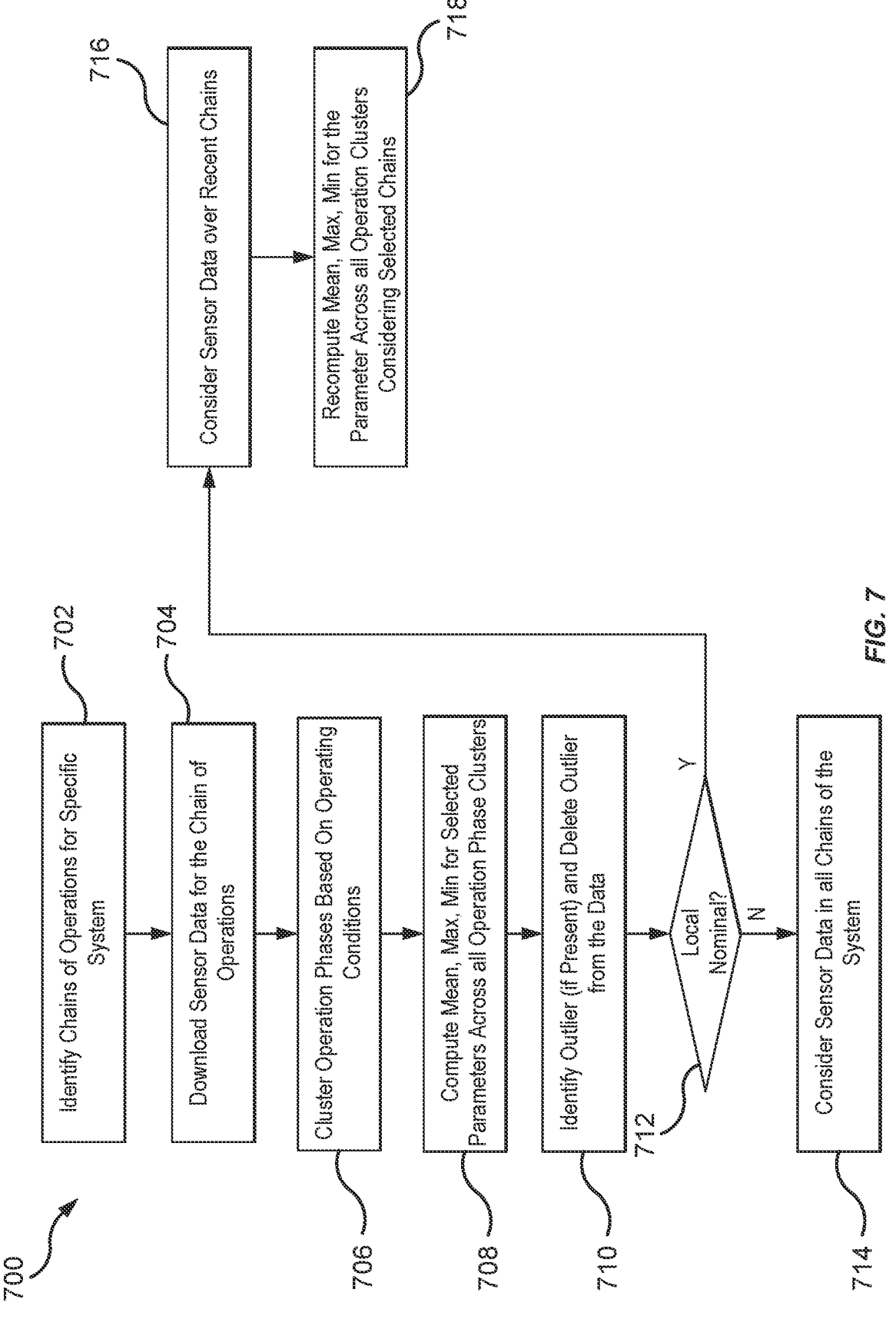
FIG. 7 is a flowchart illustrating anomaly detection and fault isolation for a sub-system in a specific aircraft tail, according to one aspect.

FIG. 7 is a flowchart 700 illustrating anomaly detection and fault isolation for a sub-system in a specific aircraft tail, according to one aspect. In an aspect, FIGS. 3-6 illustrate anomaly detection and fault isolation for multiple redundant sub-systems (e.g., more than two redundant sub-systems, as illustrated in FIG. 3). This corresponds with block 132 illustrated in FIG. 1.

FIG. 7 corresponds with block 142 and illustrates anomaly detection for a sub-system in a specific aircraft tail, using historical data for the system (e.g., without requiring multiple redundant sub-systems). At block 702 an anomaly detection service (e.g., the anomaly detection service 212 illustrated in FIG. 2) identifies a chain of operations for a specific system (e.g., a specific aircraft tail). For example, the anomaly detection service can identify a chain of flight legs for a specific aircraft tail (e.g., 40 flight legs). The anomaly detection service can use historical warnings for the aircraft to identify the chain of flight legs. For example, the anomaly detection service can identify a historic warning for a specific aircraft and then a chain of flight legs away from that warning (e.g., before or after the warning).

At block 704, the anomaly detection service downloads sensor data for the chain of operations. For example, at block 702 the anomaly detection service can identify a chain of historical flight legs for an aircraft (e.g., 40 flight legs). The anomaly detection service can download sensor data for one or more particular sub-systems, in this chain of flight legs.

At block 706, the anomaly detection service clusters operation phases based on operating conditions. For example, the anomaly detection service can cluster flight phases based on operating conditions during the flight. The operating conditions can include altitude, velocity (e.g., Mach number), throttle position, flight phase, and any other suitable operating conditions.

At block 708 the anomaly detection service computes a mean, maximum, and minimum for selected parameters across the operation phase clusters. For example, the anomaly detection service can compute a mean, maximum, and minimum (or any combination thereof) for one or more parameters of the sub-system at issue across the various operation phase clusters.

At block 710, the anomaly detection service identifies an outlier (if present) and deletes the outlier from the data. For example, the anomaly detection service can use the mean, maximum, and minimum computed at block 708 to identify outlier parameter values. This can include parameter values that differ from the mean, based on statistical analysis.

At block 712, the anomaly detection service determines whether there is a local nominal. In an aspect, a local nominal is a configuration parameter defined by a user. If so, the flow proceeds to block 716. If not, the flow proceeds to block 714. At block 714, the anomaly detection service considers sensor data in all chains of the system, to identify anomalies. At block 716, the anomaly detection service considers sensor data over recent chains (e.g., as opposed to all chains). At block 718, the anomaly detection service recomputes the mean, maximum, and minimum (or any combination thereof) for the parameters across all operation clusters considering only the selected recent chains.

In an aspect, the techniques illustrated in FIG. 7 are used to identify nominal values for the sub-system at issue (e.g., based on historical operations of a specific system, rather than multiple redundant sub-systems as illustrated in FIGS. 3-6). After the local nominal is identified, the same techniques discussed above in relation to blocks 408-414 can be used for anomaly detection and fault isolation. For example, the anomaly detection service can use the nominal value to determine a health index for the sub-system at issue, detect anomalies and identify sub-systems with an anomaly, train a reasoning algorithm for fault isolation, and isolate component(s) causing fault using the reasoning algorithm. These are all discussed further, above, in relation to blocks 408, 410, 412, and 414 illustrated in FIG. 4.

Figure 8:
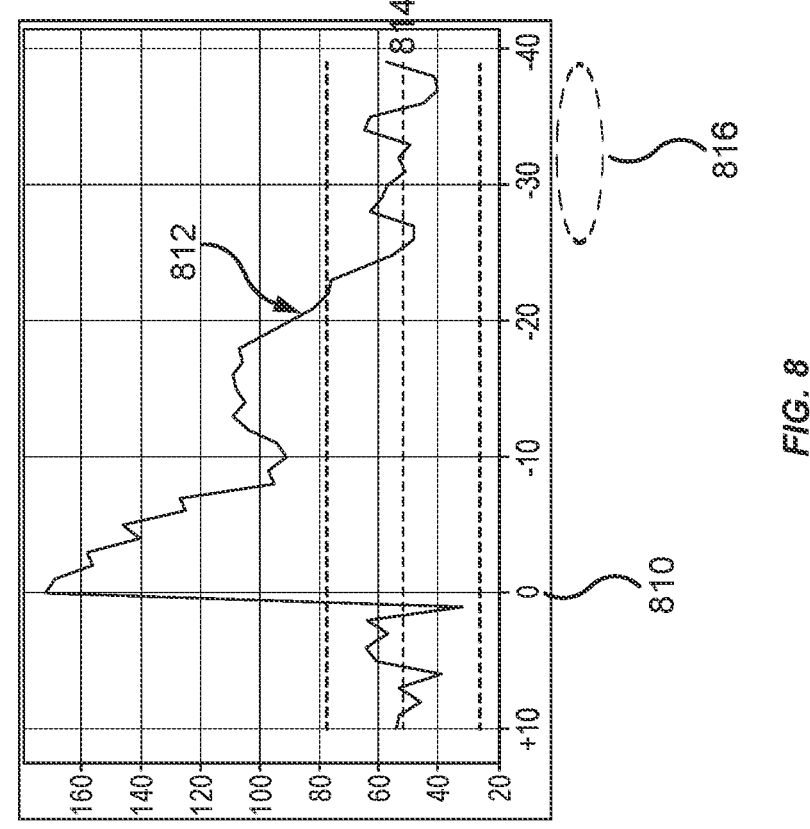
FIG. 8 further illustrates anomaly detection and fault isolation for a sub-system in a specific aircraft tail, according to one aspect.

FIG. 8 further illustrates anomaly detection and fault isolation for a sub-system in a specific aircraft tail, according to one aspect. In an aspect, FIG. 8 illustrates a characteristic of a sub-system (e.g., a parameter or combination of parameters) across a number of flight legs. A y-axis represents the value of the characteristic for a given flight leg, while an x-axis illustrates a number of flight legs. A line 814 represents the nominal value for the system (e.g., determined using the techniques discussed above in relation to FIG. 7). The variation of the graph compared with the nominal value 814 is used to identify an anomaly in operation of the sub-system.

For example, at 810, a sub-system degradation or failure is corrected. A maintenance message can be triggered, a part can be replaced, or any other suitable correction can be taken. After 810 the graphed characteristic (e.g., the sub-system parameter or combination of parameter) increases, indicating improved operation. At 812, a degradation alert is triggered (e.g., as the graphed characteristic falls). In an aspect, at 816 a mean of the graphed characteristic (e.g., plus or minus three standard deviations) based on a number of flight legs (e.g., based on 15 flight legs).

Figure 9:
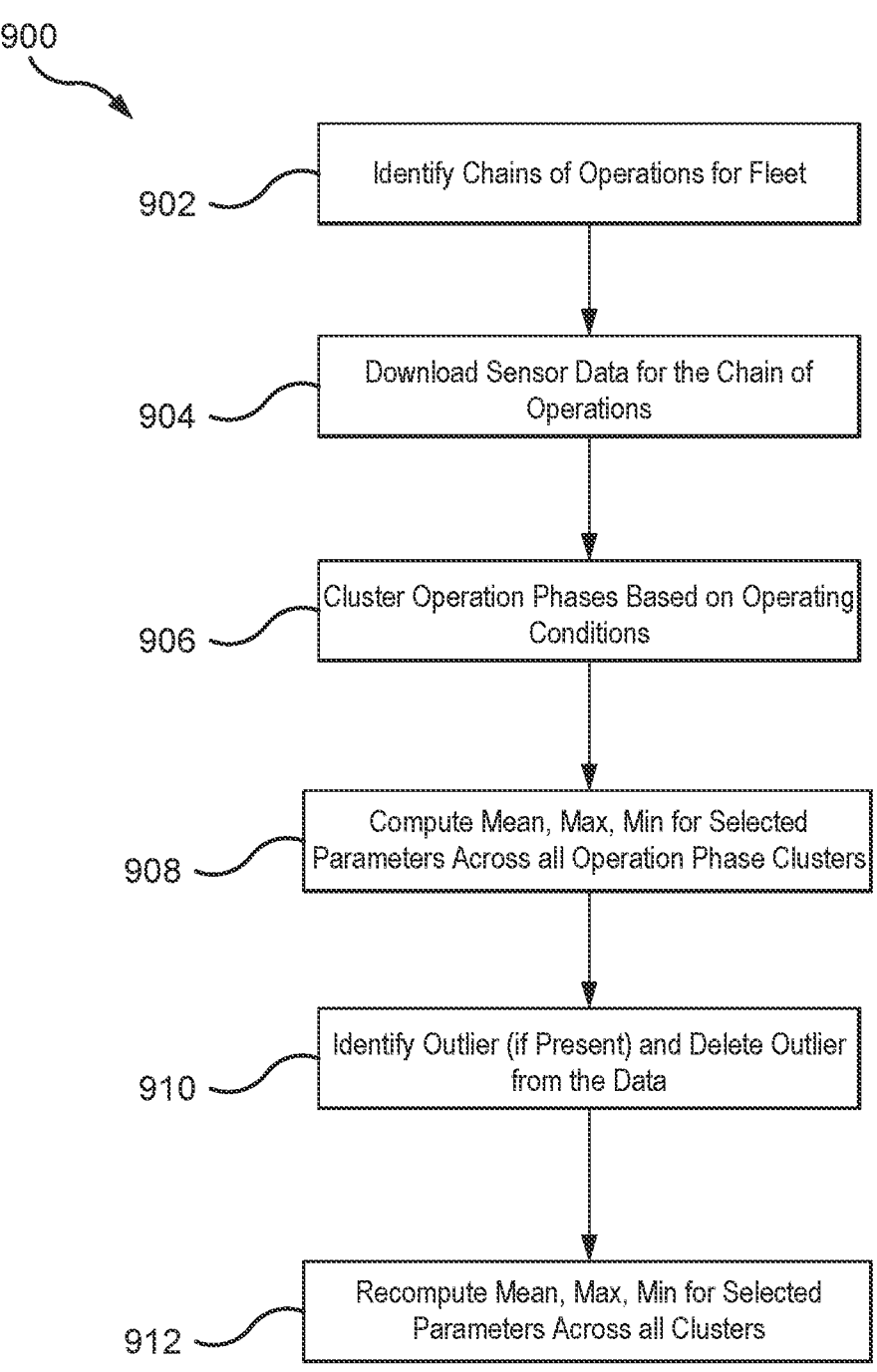
FIG. 9 illustrates anomaly detection and fault isolation for a sub-system of all aircraft in a fleet, according to one aspect.

FIG. 9 illustrates a flowchart 900 for anomaly detection and fault isolation for a sub-system of all aircraft in a fleet, according to one aspect. In an aspect, FIGS. 3-6 illustrate anomaly detection and fault isolation for multiple redundant sub-systems (e.g., more than two redundant sub-systems, as illustrated in FIG. 3). This corresponds with block 132 illustrated in FIG. 1.

FIG. 9 corresponds with block 144 and illustrates anomaly detection for a sub-system of all aircraft in a fleet, using historical data for the fleet (e.g., without requiring multiple redundant sub-systems). At block 902 an anomaly detection service (e.g., the anomaly detection service 212 illustrated in FIG. 2) identifies a chain of operations for a fleet of systems (e.g., a fleet of aircraft). For example, the anomaly detection service can identify a chain of flight legs for a fleet of aircraft. The anomaly detection service can use historical warnings for the fleet to identify the chain of flight legs. For example, the anomaly detection service can identify a historic warning for an aircraft in a fleet and then a chain of flight legs away from that warning (e.g., before or after the warning).

At block 904, the anomaly detection service downloads sensor data for the chain of operations. For example, at block 902 the anomaly detection service can identify a chain of historical flight legs for a fleet of aircraft. The anomaly detection service can download sensor data for one or more particular sub-systems, in this chain of flight legs.

At block 906, the anomaly detection service clusters operation phases based on operating conditions. For example, the anomaly detection service can cluster flight phases based on operating conditions during the flight. The operating conditions can include altitude, velocity (e.g., Mach number), throttle position, flight phase, and any other suitable operating conditions.

At block 908 the anomaly detection service computes a mean, maximum, and minimum for selected parameters across the operation phase clusters. For example, the anomaly detection service can compute a mean, maximum, and minimum (or any combination thereof) for one or more parameters of the sub-system at issue across the various operation phase clusters.

At block 910, the anomaly detection service identifies an outlier (if present) and deletes the outlier from the data. For example, the anomaly detection service can use the mean, maximum, and minimum computed at block 908 to identify outlier parameter values. This can include parameter values that differ from the mean, based on statistical analysis.

At block 912, the anomaly detection service recomputes the mean, maximum, and minimum (or any combination thereof) for the parameters across all operation clusters. For example, at block 910 the anomaly detection service removes outliers from the data. The anomaly detection service can then recompute the mean, maximum, and minimum (e.g., without the outlier data).

In an aspect, the techniques illustrated in FIG. 9 are used to identify nominal values for the sub-system at issue (e.g., based on historical operations of a fleet of systems, rather than multiple redundant sub-systems as illustrated in FIGS. 3-6). After the computation of the nominal value at the fleet level, the same techniques discussed above in relation to blocks 408-414 can be used for anomaly detection and fault isolation. For example, the anomaly detection service can use the nominal value to determine a health index for the sub-system at issue, detect anomalies and identify sub-systems with an anomaly, train a reasoning algorithm for fault isolation, and isolate component(s) causing fault using the reasoning algorithm. These are all discussed further, above, in relation to blocks 408, 410, 412, and 414 illustrated in FIG. 4.

Figure 10:
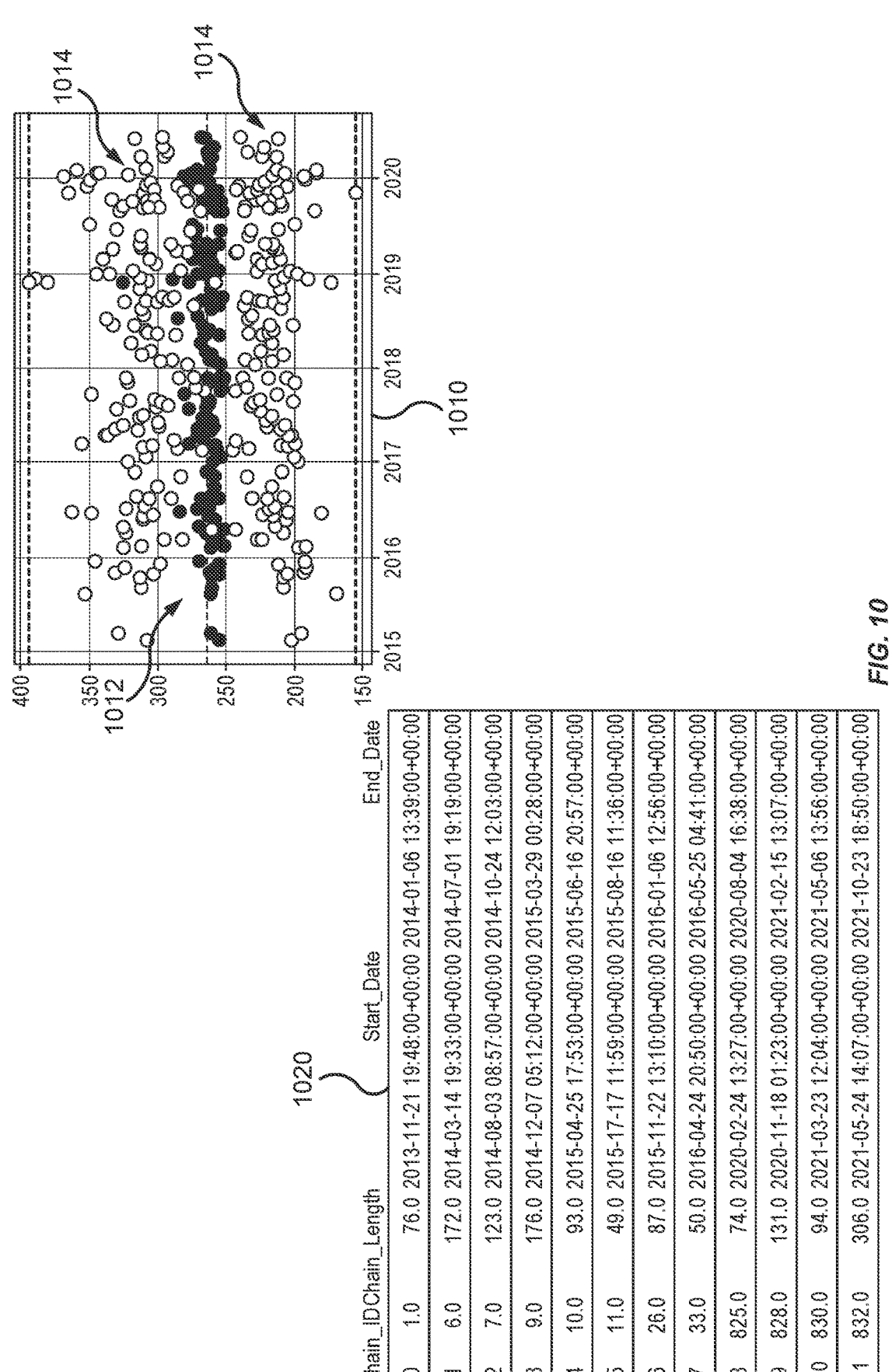
FIG. 10 further illustrates anomaly detection and fault isolation for a sub-system of all aircraft in a fleet, according to one aspect.

FIG. 10 further illustrates anomaly detection and fault isolation for a sub-system of all aircraft in a fleet, according to one aspect. A diagram 1010 illustrates statistics (e.g., mean, max, min) for each parameter of each nominal chain across historical flight legs of aircraft in a fleet. In an aspect, the entries 1012 illustrate nominal values (e.g., calculated using the techniques illustrated using FIG. 9) while the entries 1014 illustrate values that differ from the nominal values and can be used for anomaly detection. A diagram 1020 illustrates chains of flight legs for an aircraft representing most probable nominal flight legs, as discussed above in relation to block 902 illustrated in FIG. 9.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
identifying a plurality of three or more redundant sub-systems in a system associated with a vehicle;
forming a plurality of combinations of the redundant sub-systems, each combination relating to a subset of the plurality of redundant sub-systems;
obtaining sensor values measured directly via one or more sensor devices;
identifying a first combination with the least variability among a plurality of sub-systems, from among the plurality of combinations of redundant sub-systems,
wherein identifying the first combination with the least variability is based on measured sensor values for the plurality of sub-systems and parameters from one or more digital twins associated with the one or more redundant sub-systems, and
wherein the one or more digital twins are virtual representations related to the one or more redundant sub-systems;
computing one or more nominal values for one or more parameters of a first sub-system, of the plurality of sub-systems, using the first combination;
detecting an anomaly in the first sub-system based on the computed one or more nominal values;
isolating the first sub-system based on detecting the anomaly; and
performing, based on isolating the first sub-system, at least one of repairing or disabling a component of the first sub-system.

2. The method of claim 1, wherein the system comprises an aircraft and the three or more redundant sub-systems comprise redundant sub-systems in the aircraft.

3. The method of claim 2, wherein identifying the first combination with the least variability is based on measured sensor values for one or more sub-systems and at least one of: (i) calculated physics based parameters for the one or more sub-systems or (ii) parameters from a digital twin relating to the one or more sub-systems.

4. The method of claim 3, wherein identifying the first combination with the least variability is based on both calculated physics based parameters for the one or more sub-systems and parameters from the digital twin relating to the one or more sub-systems.

5. The method of claim 2, wherein computing the one or more nominal values for one or more parameters of the first sub-system, of the plurality of sub-systems, using the first combination, comprises:
averaging each parameter of the one or more parameters across the sub-systems in the first combination.

6. The method of claim 5, wherein identifying the first combination with the least variability among sub-systems, from among the plurality of combinations of redundant sub-systems further identifies one or more outlier values excluded from the first combination.

7. The method of claim 2, wherein detecting the anomaly in the first sub-system based on the computed one or more nominal values comprises:
determining a health index for the first sub-system based on calculating at least one of a cosine similarity or Euclidian distance for a plurality of parameters in the sub-system compared with the computed one or more nominal values.

8. The method of claim 7, wherein determining the health index for the first sub-system is based on calculating both the cosine similarity and the Euclidian distance for the plurality of parameters in the sub-system compared with the computed one or more nominal values.

9. The method of claim 2, further comprising:
identifying a first component at least partially responsible for the anomaly in the first sub-system.

10. The method of claim 9, wherein identifying the first component at least partially responsible for the anomaly in the first sub-system further comprises:
using a reasoning algorithm to identify the first component, based on the anomaly.

11. The method of claim 10, wherein the reasoning algorithm is a Bayesian network trained based on historical data relating to operation of the aircraft.

12. A system, comprising:
one or more processors; and
one or more memories storing a program, which, when executed on any combination of the one or more processors, performs an operation, the operation comprising:
obtaining sensor values measured directly via one or more sensor devices;
identifying a plurality of three or more redundant sub-systems in a system,
wherein identifying the first combination with the least variability is based on measured sensor values for the plurality of sub-systems and parameters from one or more digital twins associated with the one or more redundant sub-systems, and
wherein the one or more digital twins are virtual representations related to the one or more redundant sub-systems;
forming a plurality of combinations of the redundant sub-systems, each combination relating to a subset of the plurality of redundant sub-systems;
identifying a first combination with the least variability among sub-systems, from among the plurality of combinations of redundant sub-systems;
computing one or more nominal values for one or more parameters of a first sub-system, of the plurality of sub-systems, using the first combination;
detecting an anomaly in the first sub-system based on the computed one or more nominal values;
isolating the first sub-system based on detecting the anomaly; and
performing, based on isolating the first sub-system, at least one of repairing or disabling a component of the first sub-system.

13. The system of claim 12, wherein the system comprises an aircraft and the three or more redundant sub-systems comprise redundant sub-systems in the aircraft.

14. The system of claim 13, wherein identifying the first combination with the least variability is based on measured sensor values for one or more sub-systems and at least one of: (i) calculated physics based parameters for the one or more sub-systems or (ii) parameters from a digital twin relating to the one or more sub-systems.

15. The system of claim 13, wherein computing the one or more nominal values for one or more parameters of the first sub-system, of the plurality of sub-systems, using the first combination, comprises:

averaging each parameter of the one or more parameters across the sub-systems in the first combination; and
wherein detecting the anomaly in the first sub-system based on the computed one or more nominal values comprises:
determining a health index for the first sub-system based on calculating at least one of a cosine similarity or Euclidian distance for a plurality of parameters in the sub-system compared with the computed one or more nominal values.

16. The system of claim 13, further comprising:
identifying a first component at least partially responsible for the anomaly in the first sub-system, comprising:
using a reasoning algorithm to identify the first component, based on the anomaly.

17. A computer program product comprising:
a non-transitory computer-readable storage medium having computer-readable program code embodied therewith, the computer-readable program code executable by one or more computer processors to perform an operation, the operation comprising:
obtaining sensor values measured directly via one or more sensor devices;
identifying a plurality of three or more redundant sub-systems in a system;
forming a plurality of combinations of the redundant sub-systems, each combination relating to a subset of the plurality of redundant sub-systems;
identifying a first combination with the least variability among sub-systems, from among the plurality of combinations of redundant sub-systems,
wherein identifying the first combination with the least variability is based on measured sensor values for the plurality of sub-systems and parameters from one or more digital twins associated with the one or more redundant sub-systems, and
wherein the one or more digital twins are virtual representations related to the one or more redundant sub-systems;
computing one or more nominal values for one or more parameters of a first sub-system, of the plurality of sub-systems, using the first combination;
detecting an anomaly in the first sub-system based on the computed one or more nominal values;
isolating the first sub-system based on detecting the anomaly; and
performing, based on isolating the first sub-system, at least one of repairing or disabling a component of the first sub-system.

18. The computer program product of claim 17, wherein the system comprises an aircraft and the three or more redundant sub-systems comprise redundant sub-systems in the aircraft.

19. The computer program product of claim 18, wherein computing the one or more nominal values for one or more parameters of the first sub-system, of the plurality of sub-systems, using the first combination, comprises:
averaging each parameter of the one or more parameters across the sub-systems in the first combination; and
wherein detecting the anomaly in the first sub-system based on the computed one or more nominal values comprises:
determining a health index for the first sub-system based on calculating at least one of a cosine similarity or Euclidian distance for a plurality of parameters in the sub-system compared with the computed one or more nominal values.

20. The computer program product of claim 18, further comprising:

identifying a first component at least partially responsible for the anomaly in the first sub-system, comprising:

using a reasoning algorithm to identify the first component, based on the anomaly.

\* \* \* \* \*